United States Patent
Kuttenberger et al.

(10) Patent No.: US 7,616,101 B2
(45) Date of Patent: Nov. 10, 2009

(54) DEVICE FOR MONITORING THE SURROUNDINGS OF A VEHICLE

(75) Inventors: Alfred Kuttenberger, Nufringen (DE); Dirk Weber, Schwiebordingen (DE)

(73) Assignee: Robert Bosch GmbH, Stuttgart (DE)

( * ) Notice: Subject to any disclaimer, the term of this patent is extended or adjusted under 35 U.S.C. 154(b) by 214 days.

(21) Appl. No.: 10/520,345

(22) PCT Filed: Feb. 26, 2003

(86) PCT No.: PCT/DE03/00613
§ 371 (c)(1),
(2), (4) Date: Aug. 18, 2005

(87) PCT Pub. No.: WO2004/008174
PCT Pub. Date: Jan. 22, 2004

(65) Prior Publication Data
US 2006/0164218 A1    Jul. 27, 2006

(30) Foreign Application Priority Data
Jul. 11, 2002    (DE) ................ 102 31 362

(51) Int. Cl.
G08B 21/00    (2006.01)
G08G 1/16    (2006.01)
B60T 7/12    (2006.01)
G01S 13/50    (2006.01)
B60R 22/343    (2006.01)

(52) U.S. Cl. .............. 340/435; 340/903; 342/70; 342/72; 701/45; 701/301; 180/167; 180/169; 280/807

(58) Field of Classification Search ............... 340/435, 340/903; 342/72; 701/45, 301; 180/271, 180/274, 281, 282; 280/806, 735
See application file for complete search history.

(56) References Cited

U.S. PATENT DOCUMENTS

| | | | | |
|---|---|---|---|---|
| 3,420,572 A * | 1/1969 | Bisland | ............. | 180/271 |
| 5,461,357 A * | 10/1995 | Yoshioka et al. | ........... | 340/435 |
| 5,515,448 A * | 5/1996 | Nishitani | ............. | 382/106 |
| 5,959,552 A * | 9/1999 | Cho | ............. | 340/903 |
| 6,213,512 B1 * | 4/2001 | Swann et al. | ............. | 280/806 |
| 6,295,495 B1 | 9/2001 | Morman et al. | | |
| 6,801,843 B2 * | 10/2004 | Rao et al. | ............. | 701/45 |
| 7,009,500 B2 * | 3/2006 | Rao et al. | ............. | 340/435 |
| 7,287,884 B2 * | 10/2007 | Koike | ............. | 362/464 |
| 2002/0134607 A1 * | 9/2002 | Recknagel | ............. | 180/274 |

FOREIGN PATENT DOCUMENTS

| | | |
|---|---|---|
| DE | 26 23 643 | 12/1977 |
| DE | 411 3031 | 10/1992 |
| DE | 196 37 053 | 4/1998 |
| EP | 0 550 852 | 7/1993 |
| EP | 0 605 104 | 7/1994 |
| EP | 0842829 | 5/1998 |
| WO | WO 95 14939 | 6/1995 |

* cited by examiner

*Primary Examiner*—Davetta W Goins
*Assistant Examiner*—Anne V Lai
(74) *Attorney, Agent, or Firm*—Kenyon & Kenyon LLP

(57) ABSTRACT

A device is provided in a vehicle for monitoring the environment around the vehicle. The device includes a sensor system such that objects in a detection range of the sensor system are selected as a function of predetermined parameters so that only the selected objects are tracked by the sensor system. This permits adaptive use of reversible restraint means based on the sensor system output.

12 Claims, 2 Drawing Sheets

DEVICE FOR MONITORING THE SURROUNDINGS OF A VEHICLE

FIELD OF THE INVENTION

The present invention relates to a device in a vehicle for monitoring the environment around a vehicle.

BACKGROUND INFORMATION

Published European patent document EP 550 852 A1 describes a device in a vehicle for monitoring the surroundings, including an environment sensor system having a predetermined detection range, an analysis module being provided for analyzing a signal from the environment sensor system.

SUMMARY

The device according to the present invention in a vehicle for monitoring the environment around a vehicle has the advantage over the related art that by selecting objects by interpretation of the environment and the situation, the environment sensor system limits itself to pre-crash-relevant objects. This selection is advantageous for reporting only those objects which might actually result in an accident. This permits better differentiation between crash-relevant objects and non-crash-relevant objects to prevent instances of misinterpretation.

It is particularly advantageous that the parameters according to which the device according to the present invention selects the relevant objects include the relative speed between the vehicle and the particular object, the direction of the relative speed, and the curve radius, as well as the type of traffic. The type of traffic is understood to refer, for example, to whether there is right-hand traffic or left-hand traffic. The device includes a sensor system having one or more sensors which detect objects continuously. The detection range has a fixed beam angle and a fixed range. A great many objects may be detected in the detection range of the sensor system.

Depending on the driving situation, there are a number of parameters which make it possible to reduce the attention window. The attention window is also based on the probability of occurrence of objects in this range.

First, there is the distance in front of the vehicle as a function of the relative speed or in a special case only the vehicle speed if the time is fixed. Thus, for example, a reversible seatbelt tightening device will always have the same activation time. Accordingly, the attention window must also be increased in the x direction as the speeds become higher, in order to provide the appropriate time for the restraint means, by tracking objects in a larger area.

The attention window in the y direction, i.e., in the transverse direction, depends on the relative speed between the vehicle and the object. At high speeds, the probability for objects approaching the vehicle at a larger angle of approach is relatively low. Accordingly, the attention window in the y direction may be selected to be smaller.

The same is also true of passing vehicles, which occur every day on rural roads and communities. The distance from passing vehicles is a function of speed.

The attention window in y direction is a function of the curve radius. A small curve radius requires a large attention window in the y direction.

For the interpretation of driving situations, another factor to be taken into account is whether traffic is left-hand or right-hand traffic. Thus, in the case of right-hand traffic, automobiles being parked or automobiles to be passed, and thus having a low relative speed, are detected on the right. Vehicles coming from the opposite direction and coming at a high relative speed are detected on the left.

In addition, it is advantageous that the analyzer unit of the device according to the present invention is connectable to at least one restraint means, so that the analyzer unit triggers the at least one restraint means as a function of the tracking of the at least one object. In particular, when the object is on a collision course with one's own vehicle and the distance is less than a threshold distance for deploying a reversible restraint means such as seatbelt tightening systems, then the analyzer unit will generate a triggering signal to deploy the restraint means.

It is advantageous that the restraint means are designed to be reversible or at least partially reversible. This includes, e.g., reversible seatbelt tightening systems or an extensible bumper.

DETAILED DESCRIPTION

In the future new functions will be developed for drivers to support them in driving a vehicle. These functions will include both comfort functions and safety functions. With regard to the safety functions, the pre-crash function will assume an important role because detecting an imminent collision is extremely important in reducing the severity of the collision for the occupants of the vehicle. In particular it may also be possible to prevent the collision completely. However, it is problematical that during a normal driving operation, many objects may be detected in the area in front of a vehicle. According to the present invention, a device is provided for monitoring the environment and interpreting the environment in order to select only those objects which might also be hazardous and crash-relevant in the sense of protecting the occupants of the vehicle.

Figure 1:
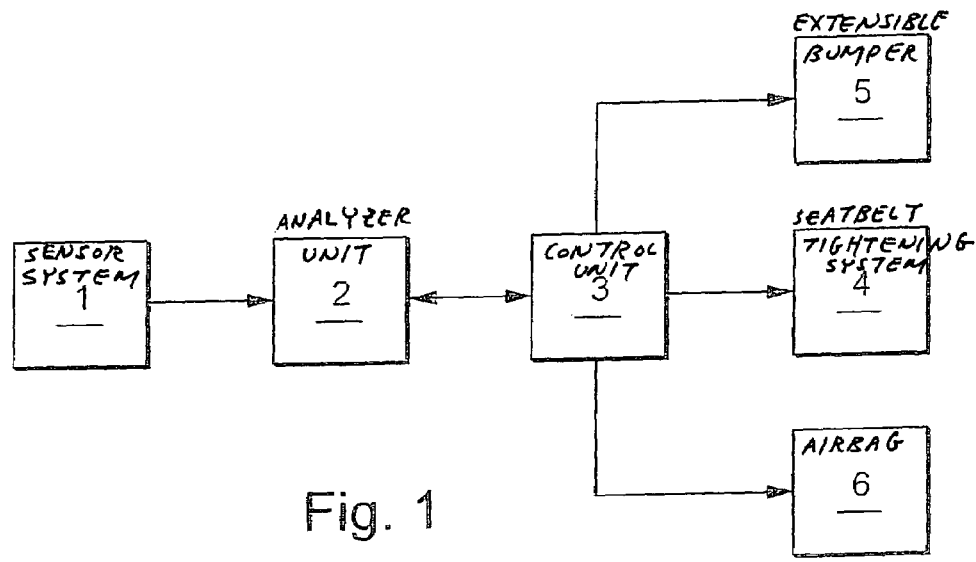
FIG. 1 shows a block diagram of the device according to the present invention.

FIG. 1 shows a block diagram of an example embodiment of the device according to the present invention. A sensor system 1 is connected to an analyzer unit 2 via a data output. Analyzer unit 2 is connected to a control unit for restraint means 3 via a data input/output. This control unit 3 is in turn connected to a reversible seatbelt tightening system 4 via a first data output, to an extensible bumper 5 via a second data output and to airbags 6 in the vehicle via a third data output.

Sensor system 1 here includes distance sensors, which are also understood to include environment sensors such as video, radar, ultrasound or even infrared sensors suitable for monitoring the environment. Control unit 3 is also connected to impact sensors (not shown here) which detect an actual crash. These may be acceleration sensors, but deformation sensors may also be used here. Sensor system 1 supplies a digital data stream to analyzer module 2. Sensor system 1 therefore has signal processing and an analog-digital converter. Analyzer module 2 may be a processor or dedicated hardware, i.e., an integrated circuit produced for this purpose. Sensor system 1 and analyzer module 2 may both be situated in one housing. However, sensor system 1 may also be situated in an offset position from analyzer module 2, so that different video sensors mounted on the vehicle, for example, may be connected to just one analyzer module 2. With such an offset connection, it is possible for either each individual sensor of sensor system 1 to be connected to analyzer module 2 by a two-wire line, or for an entire sensor bus to be used to connect the individual sensors of sensor system 1 to analyzer module 2, e.g., as a bus master. The connection may be implemented electrically, optically or via radio waves. If analyzer module 2 is offset from sensor system 1, then this analyzer module 2 functions as a control unit and may, if necessary, also be set up in one housing with control unit 3. If analyzer module 2 and control unit 3 are installed in different housings, then the connection between them is implemented either by a two-wire line or by a bus which interconnects a plurality of control units.

Control unit 3 itself calculates the deployment algorithm for restraint means 4, 5 and 6. The signal from sensor system 1 is also used to deploy reversible restraint means, such as seatbelt tightening system 4 and extensible bumper 5, even before the impact. An adaptive airbag which is inflated relatively gently, i.e., with a short inflation time, may already be deployed before the actual collision. Other parameters that enter into the deployment algorithm include the signals from the impact sensors, i.e., the acceleration sensors, for example, as mentioned above.

According to the present invention, analyzer unit 2 selects from the objects recognized by sensor system 1 those which might be relevant for causing a collision, taking into account parameters such as the relative speed between these objects and the vehicle, their direction, and the driving situation, as well as the properties of the road surface. Thus the available resources are used for the potentially hazardous objects and not for non-hazardous objects, so there is no loss of performance due to unnecessary tracking of irrelevant objects. On the other hand, due to the selection of objects the occurrence of misuse cases, i.e., non-deployment cases in which the devices are nevertheless deployed, is prevented.

The selected objects are then tracked by sensor system 1. If analyzer module 2 recognizes that an object being tracked is closer than a predetermined distance from the vehicle, a signal is transmitted to control unit 3 indicating that the restraint means that are the first to be deployed should be deployed. These include, e.g., reversible seatbelt tightening systems. This predetermined distance around the vehicle is thus a time limit for the use of such restraint means. However, even after the distance drops to less than this predetermined distance, the object is still tracked in order to be able to have precise information regarding a possible future collision, to thereby achieve an adaptive use of restraint means. Several such distance values may be preselected to determine an optimum time for deployment of the particular restraint means as a function of the respective deployment time.

Figure 2A:
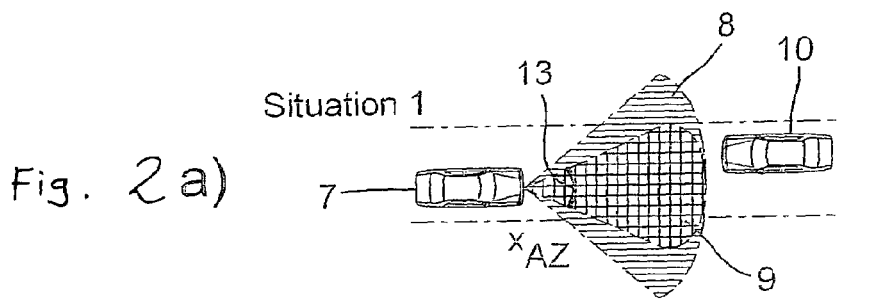
FIGS. 2a and 2b show two situations illustrating the functioning of the device according to the present invention.
Figure 2B:
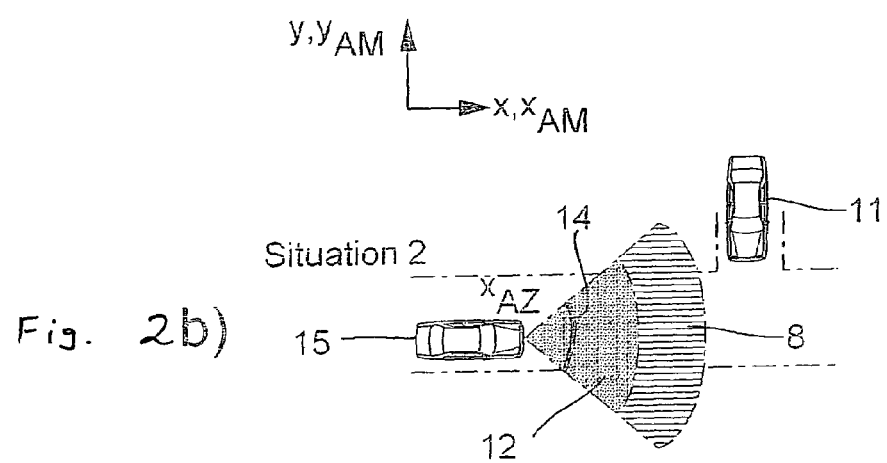

FIGS. 2a and 2b show two typical situations for the use of the device according to the present invention. A vehicle 7 has a detection range 8 for its sensor system 1, this detection range being monitored continuously by the sensor system, e.g., by radar. If a vehicle 10 enters detection range 8, this situation is detected by sensor system 1 and parameters such as relative speed and its direction relative to vehicle 7 are determined. As a function of these parameters, an attention range 9 is defined having a predetermined distance 13 such that when an object such as vehicle 10 comes closer than this distance 13, restraint means such as reversible seatbelt tightening device 4 are deployed. The vehicle speed shown in FIG. 2a is much higher than that shown in FIG. 2b, so the attention range 9 extends to the outer limit of detection range 8.

In FIG. 2b, a vehicle 15 has a sensor system 1, having detection range 8 and attention range 12. Here, too, distance boundary 14 is defined; when an object comes within this boundary, reversible seatbelt tightening system 4 is deployed. Vehicle 11 is traveling transversely to the direction of travel of vehicle 15. The relative speed between vehicles 15 and 11 is much lower here than that in FIG. 2a between vehicles 7 and 10. Therefore, attention range 12 may be much smaller than attention range 9.

Figure 3:
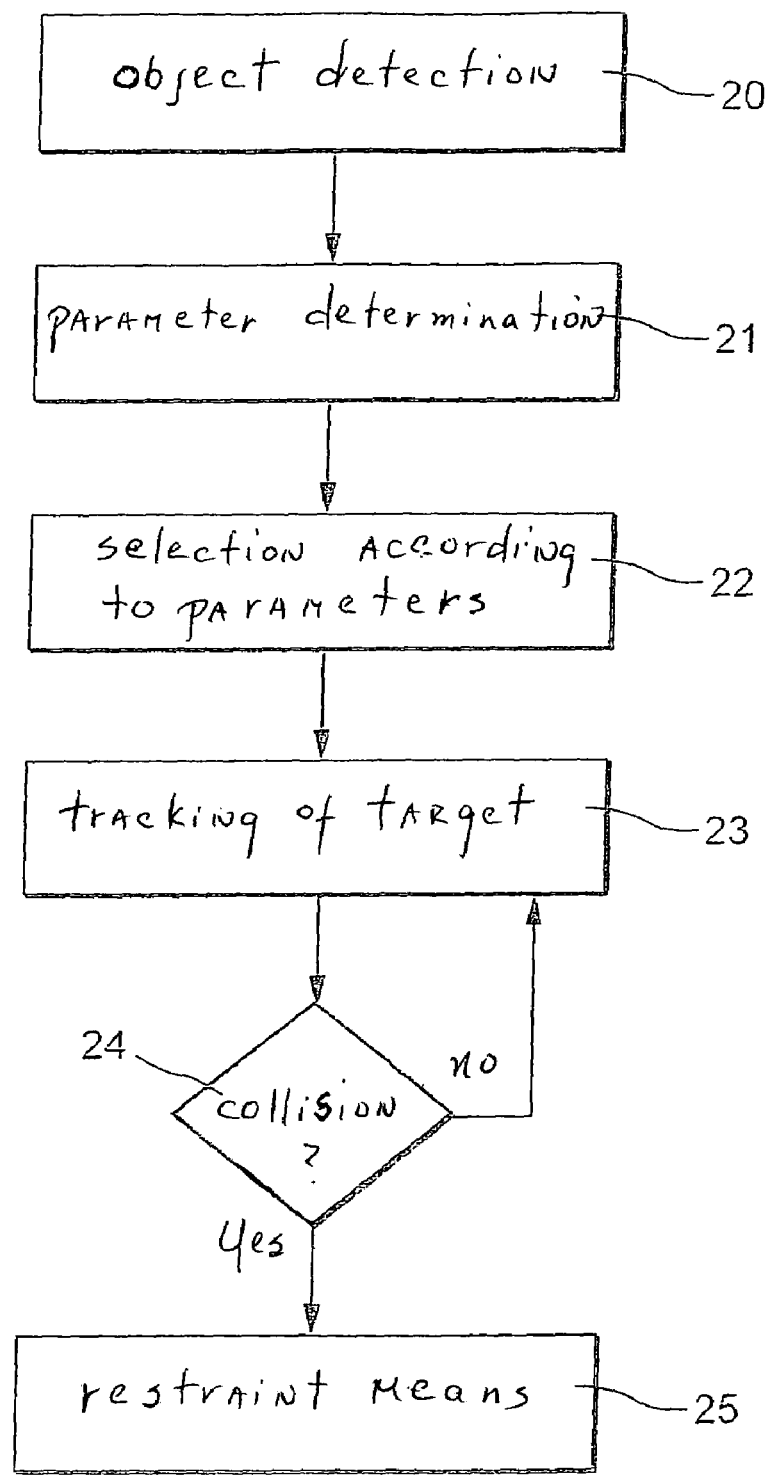
FIG. 3 shows a flow chart of an example method according to the present invention.

FIG. 3 shows a flow chart for the method according to the present invention, which method may be run on the analyzer unit or module 2. In method step 20, objects in detection range 9 are detected with the help of sensor system 1 and analyzer module 2. The parameters are then determined in method step 21, with the relative speed between one's own vehicle and the detected objects being determined in this case. The direction of the relative speed is also determined here in order to be able to estimate whether a collision is imminent. Additional parameters which may be considered include the curve radius and the type of traffic, i.e., traffic on the right or left. Other data such as the driving behavior of the other objects may also be included as parameters here. The individual parameters are weighted to derive a conclusion in method step 22 regarding which objects are relevant and must be subjected to tracking, which is performed in method step 23, to deploy the restraint means as soon as possible in the event of an imminent crash.

In method step 24 monitoring is performed to determine whether the objects tracked have a high likelihood of causing a collision with one's own vehicle. This is monitored on the basis of predetermined distances 13 or 14, namely whether an object is within these distances. If a tracked object comes within such a safety distance, there is a switch from method step 24 to method step 25 to deploy the particular restraint means associated with this distance being breached. However, if a collision is not imminent based on the test in method step 24, tracking of the object is continued in method step 23. Several objects may be tracked simultaneously, but this number should be as low as possible to achieve effective utilization of resources of the available hardware and software. If the number of objects to be tracked is too high, the response time of the device according to the present invention may be reduced.

What is claimed is:

1. A device in a vehicle for monitoring the environment around the vehicle, comprising:
   an environment sensor system having a predetermined detection range; and
   an analyzer module for analyzing a signal of the environment sensor system, wherein the analyzer module selects and tracks at least one object in the predetermined detection range by determining an attention range as a function of at least one predetermined parameter, and wherein the attention range includes a threshold distance at which a restraint unit associated with the vehicle is triggered, wherein the threshold distance is selected to optimize, based on a duration required for deployment of the restraint unit, a triggering time.

2. The device as recited in claim 1, wherein the at least one predetermined parameter includes one of a relative speed between the vehicle and the at least one object, a direction of the relative speed, a curve radius, and a type of traffic.

3. The device as recited in claim 2, wherein the analyzer module is connected to at least one restraint unit associated with the vehicle, the analyzer module triggering the at least one restraint unit as a function of tracking of the at least one object.

4. The device as recited in claim 3, wherein the at least one restraint unit is a reversible-type restraint unit.

5. The device as recited in claim 4, wherein the at least one restraint unit is one of a reversible seatbelt tightening system and an extensible bumper.

6. The device as recited in claim 1, wherein the threshold distance is adjusted along a longitudinal axis and a transverse axis of the vehicle in response to changes in the at least one predetermined parameter, the adjustment along the longitudinal axis being independent of the adjustment along the transverse axis.

7. The device as recited in claim 1, wherein a perimeter of the attention range is limited to the detection range of the sensor system and conforms to a general shape of the detection range while varying in size according to the threshold distance.

8. The device as recited in claim 1, wherein the threshold distance is adjusted along a longitudinal axis and a transverse axis of the vehicle in response to changes in the at least one predetermined parameter, the adjustment along the longitudinal axis being independent of the adjustment along the transverse axis, and wherein a perimeter of the attention range is limited to the detection range of the sensor system and conforms to a general shape of the detection range while varying in size according to the threshold distance.

9. The device as recited in claim 8, wherein the at least one predetermined parameter includes one of a relative speed between the vehicle and the at least one object, a direction of the relative speed, a curve radius, and a type of traffic, wherein the analyzer module is connected to at least one restraint unit associated with the vehicle, the analyzer module triggering the at least one restraint unit as a function of tracking of the at least one object.

10. The device as recited in claim 9, wherein the at least one restraint unit is a reversible-type restraint unit.

11. The device as recited in claim 9, wherein the at least one restraint unit is one of a reversible seatbelt tightening system and an extensible bumper.

12. The device as recited in claim 1, wherein the at least one predetermined parameter includes one of a relative speed between the vehicle and the at least one object, a direction of the relative speed, a curve radius, and a type of traffic, wherein the analyzer module is connected to at least one restraint unit associated with the vehicle, the analyzer module triggering the at least one restraint unit as a function of tracking of the at least one object.

* * * * *

UNITED STATES PATENT AND TRADEMARK OFFICE
CERTIFICATE OF CORRECTION

PATENT NO. : 7,616,101 B2  Page 1 of 1
APPLICATION NO. : 10/520345
DATED : November 10, 2009
INVENTOR(S) : Kuttenberger et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 440 days.

Signed and Sealed this

Nineteenth Day of October, 2010

David J. Kappos
*Director of the United States Patent and Trademark Office*